United States Patent
Ichimura et al.

(10) Patent No.: US 6,404,710 B1
(45) Date of Patent: Jun. 11, 2002

(54) POSITION CONTROLLER AND POSITION CONTROL METHOD OF OPTICAL SYSTEM AND RECORDING/REPRODUCING APPARATUS AND DRIVING METHOD THEREOF

(75) Inventors: Isao Ichimura, Tokyo; Koichiro Kishima, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/611,222

(22) Filed: Jul. 6, 2000

(30) Foreign Application Priority Data

Jul. 9, 1999 (JP) .......................................... 11-196738
Jul. 9, 1999 (JP) .......................................... 11-196739

(51) Int. Cl.$^7$ ................................................ G11B 7/12
(52) U.S. Cl. ............................... 369/44.23; 369/44.28; 369/112.23
(58) Field of Search .................. 369/44.11, 44.12, 369/44.14, 44.23, 44.28, 112.01, 112.13, 112.18, 112.2, 112.23, 112.24, 112.26

(56) References Cited

U.S. PATENT DOCUMENTS 6,041,031 A * 3/2000 Ichimura et al. ..... 369/44.23 X

* cited by examiner

Primary Examiner—Muhammad Edun
(74) Attorney, Agent, or Firm—Oblon, Spivak, McClelland, Maier & Neustadt, P.C.

(57) ABSTRACT

A position controller of an optical system comprising an optical system for forming a near-field with an optical recording medium and focusing converged light to the optical recording medium; an actuator for moving the optical system in a focal direction perpendicularly intersecting a recording surface of the optical recording medium; and a control circuit for controlling the actuator so as to shorten the distance between the optical system and the optical recording medium from outside to inside the range where the near-field is formed and further maintain it inside the range; a position control method of an optical system; and a recording/reproducing apparatus and driving method thereof.

24 Claims, 8 Drawing Sheets

FIG. 4

| AIR GAP A | 0nm | 50nm | 100nm | 200nm | 10μm |
|---|---|---|---|---|---|
| INTERVAL h | 2.00μm | 2.05μm | 2.10μm | 2.20μm | 12μm |
| ELECTROSTATIC CAPACITANCE Cg | 7.82pF | 7.63pF | 7.45pF | 7.11pF | 1.3pF |
| OSCILLATION FREQUENCY f | 4.45MHz | 4.48MHz | 4.51MHz | 4.57MHz | 6.34MHz |

POSITION CONTROLLER AND POSITION CONTROL METHOD OF OPTICAL SYSTEM AND RECORDING/REPRODUCING APPARATUS AND DRIVING METHOD THEREOF

BACKGROUND OF THE INVENTION

1. Field of the Invention

The present invention relates to a position controller and position control method of an optical system for focusing converged light on an optical recording medium and a recording/reproducing apparatus for recording or reproducing information by focusing converged light on an optical recording media and a driving method of the same.

2. Description of the Related Art

As an optical apparatus, there are, for example, a recording/reproducing apparatus for recording or reproducing information using an optical disk or other optical recording medium, an optical microscope, etc.

A cut-off spatial frequency fc in an optical apparatus is generally expressed by formula (1) below by using a numerical aperture NA of an object lens and a wavelength λ of an output light from a light source.

$$fc = 2NA/\lambda \tag{1}$$

The shorter the wavelength λ of light from the light source and the larger the numerical aperture NA on the object lens, the higher the resolution, so recording at a high density becomes attainable in a recording/reproducing apparatus and detailed observation becomes attainable in an optical microscope.

As a method of increasing the numerical aperture NA of an object lens, there is known a near-field optical system using a solid immersion lens (SIL). An optical system having a numerical aperture exceeding "1" has been attained by this method.

As a reference regarding a near-field optical system and a solid immersion lens, there is S. M. Mansfield, W. R. Studenmund, G. S. Kino, and K. Osato, "High-numerical aperture lens system for optical storage", Opt. Lett. 18, pp. 305–307 (1993) (hereinafter referred to as "Reference 1").

Also, as another reference, there is, for example, H. J. Mamin, B. D. Terris, and D. Rugar, "Near-field optical data storage", Appl. Phys. Lett. 68, pp. 141–143 (1996) (hereinafter referred to as "Reference 2").

Note that the U.S. Pat. Nos. 4,183,060 and 4,300,226 disclose detecting a distance between an optical disk and an electrode by a capacitance sensor, however, do not describe a near-field optical system and a solid immersion lens (SIL).

Japanese Unexamined Publication (Kokai) No. 8-212579 discloses an invention of an optical head and an optical recording medium. In this publication, an object lens is held by a lens holder, a solid immersion lens is held by a second lens holder, and position control of the solid immersion lens is carried out based on an electrostatic capacitance between the second lens holder and the optical disk using a conductive material for the second lens holder.

In a near-field optical system, it is necessary to keep the distance (air gap) between the optical system and the optical recording medium. within the range wherein the near-field is formed (near-field range) in order to focus light effectively on the optical recording medium.

Especially, when the numerical aperture exceeds 1, if the air gap becomes larger than the near-field range, the intensity of the light on the optical recording medium largely declines due to multi-reflection and interference of light between the optical system and the optical recording medium, so it is important to keep the air gap within the near-field range.

However, when bringing the optical system close to the optical recording medium from outside the-near-field range to within the near-field range to realize an air gap wherein a near-field is formed, for example, not more than 500 nm (preferably, an air gap of not more than 100 nm), there is the possibility that the optical system and the optical recording medium will contact or collide due to overshoot.

If the optical recording medium is rotating when the optical system and the optical recording medium contact or collide, friction will arise between the optical system and the optical recording medium and the area of contact on the surface of the optical recording medium becomes larger concentrically and circularly.

SUMMARY OF THE INVENTION

An object of the present invention is to provide a position controller and position control method of an optical system capable of effectively focusing light from a near-field optical system to an optical recording medium, a recording/reproducing apparatus, and a driving method.

Another object of the present invention is to provide a position controller and a position control method of an optical system capable of keeping the contact area and impact small when an optical system and an optical recording medium contact or collide at the time of shortening the distance between the optical system and the optical recording medium for forming a near-field.

Still another object of the present invention is to provide a recording/reproducing apparatus for recording or reproducing information by focusing light from a light source to an optical recording medium via an optical system capable of keeping the contact area and impact small when the optical system and the optical recording medium contact or collide at the time of shortening the distance between the optical system and the optical recording medium for forming a near-field and a driving method.

According to a first aspect of the present invention, there is provided a position controller of an optical system comprising an optical system for forming a near-field with an optical recording medium and focusing converged light to the optical recording medium; an actuator for moving the optical system in a focal direction perpendicularly intersecting a recording surface of the optical recording medium; and a control circuit for controlling the actuator so as to shorten the distance between the optical system and the optical recording medium from outside to inside the range where the near-field is formed and further maintain it inside the range.

Preferably, the control circuit controls the actuator so as to shorten the distance between the optical system and the optical recording medium in stages from outside to inside the range where the near-field is formed and further maintain it within the range.

More preferably, the control circuit controls the actuator to set the distance to an intermediate target value from an initial setting outside of the range, temporarily maintain it at the intermediate target value or substantially the intermediate target value, and bring it close from the intermediate target value to a final target value inside of the range.

The position controller further preferably comprises a motor for rotating the optical recording medium; the control circuit generating a starting signal after the distance is kept inside the range; and the motor starts to rotate the optical recording medium based on the starting signal.

More preferably, the position controller further comprises a laser for supplying a laser beam to the optical system after the optical recording medium rotates.

Preferably, the optical system comprises a first optical system having an object lens for converging light and a solid immersion lens for converging light passing through the object lens and focusing it on the optical recording system or a second optical system wherein the object lens and the solid immersion lens are made integral.

More preferably, the optical recording medium is an optical disk; the solid immersion lens has a central portion on a surface facing the optical disk which projects out, has a peripheral portion which is flat and formed with a conductive film, and converges light passing through the object lens and passes it through the central portion; and the control circuit controls the actuator based on an electrostatic capacitance between the conductive film and the optical disk to adjust the distance.

Preferably, the numerical aperture of the optical system is larger than 1 and equal or smaller than 3; and a range wherein the near-field is formed is a range wherein the optical system and the optical recording medium are in a non-contacting state and the distance is 500 nm or less.

According to a second aspect of the present invention, there is provided a position control method of an optical system for controlling a distance from an optical system for forming a near-field with an optical recording medium and focusing converged light to the optical recording medium to the optical recording medium, including the steps of shortening the distance between the optical system and the optical recording medium from outside to inside a range where the near-field is formed and maintaining the distance within the range.

Preferably, the distance is shortened in stages from outside to inside the range where the near-field is formed.

More preferably, the shortening step includes the steps of setting the distance from an initial setting outside the range to an intermediate target value and maintaining it at the intermediate target value or substantial intermediate target value and making the distance from the intermediate target value to a final target value inside the range.

The position control method preferably further includes a step of rotating the. optical recording medium after the distance is maintained inside the range.

The position control method preferably further includes a step of supplying a laser beam to the optical system after the optical recording medium is rotating.

Preferably, the numerical aperture of the optical system is larger than 1 and equal or smaller than 3 and the range wherein the near-field is formed is a range wherein the optical system and the optical recording medium are in a non-contacting state and the distance is 500 nm or less.

According to a third aspect of the present invention, there is provided a recording/reproducing apparatus comprising a light source; an optical system for forming a near-field with an optical recording medium, converging a light from the light source, and focusing it to the optical recording medium; an actuator for moving the optical system in a focal direction perpendicularly intersecting a recording surface of the optical recording medium; a control circuit for controlling the actuator so as to shorten the distance between the optical system and the optical recording medium from outside to inside the range where the near-field is formed and further maintain it within the range; a motor for rotating the optical recording medium at the time of recording information and reproducing information; an intensity modulation circuit for modulating a light intensity from the light source in accordance with recording information at the time of recording information; and a detection circuit for detecting recording information from reflection light reflected on the optical recording medium at the time of recording.

Preferably, the control circuit controls the actuator so as to shorten the distance in stages from outside to inside a range where the near-field is formed and maintain it within the range.

More preferably, the control circuit controls the actuator to set the distance to an intermediate target value from an initial setting outside of the range, temporarily maintain it at the intermediate target value or substantially the intermediate target value, and bring it close from the intermediate target value to a final target value inside of the range.

Preferably, the control circuit generates a starting signal after the distance is kept inside the range, and the motor starts to rotate the optical recording medium based on the starting signal.

Preferably, the light source is a laser for outputting a laser beam to the optical system after the optical recording medium is rotating.

Preferably, the optical system comprises a first optical system having an object lens for converging light from the light source and a solid immersion lens for converging light passing through the object lens and focusing it on the optical recording system or a second optical system wherein the object lens and the solid immersion lens are made integral.

Preferably, the optical recording medium is an optical disk; the solid immersion lens has a central portion on a surface facing the optical disk which projects out, has a peripheral portion which is flat and formed with a conductive film, and converges light passing through the object lens and passes it through the central portion; and the control circuit controls the actuator based on an electrostatic capacitance between the conductive film and the optical disk to adjust the distance.

Preferably, the numerical aperture of the optical system is larger than 1 and equal or smaller than 3 and a range wherein the near-field is formed is a range wherein the optical system and the optical recording medium are in a non-contacting state and the distance is 500 nm or less.

According to a fifth aspect of the present invention, there is provided a method of driving a recording/reproducing apparatus using an optical system forming a near-field with the optical recording medium to focus converged light on an optical recording medium for recording or reproducing information, including the steps of shortening the distance between the optical system and the optical recording medium from outside to inside a range where the near-field is formed; maintaining the distance within the range; rotating the optical recording medium; detecting recorded information from reflection light reflected at the optical recording medium during rotation at the time of reproducing information; and supplying modulated light modulated in intensity in accordance with recording information and focusing converged light from the optical system to the optical recording medium during rotation.

Preferably, the distance is shortened in stages from outside to inside a range where the near-field is formed.

Preferably, the shortening step includes the steps of setting the distance from an initial setting outside the range to an intermediate target value and maintaining it at the intermediate target value or substantial intermediate target value and making the distance from the intermediate target value to a final target value inside the range.

Preferably, the optical recording medium is rotated after the distance is maintained inside the range.

The method preferably further includes a step of supplying a laser beam to the optical system after the optical recording medium is rotating.

Preferably, the numerical aperture of the optical system is larger than 1 and equal or smaller than 3 and the range wherein the near-field is formed is a range wherein the optical system and the optical recording medium are in a non-contacting state and the distance is 500 nm or less.

BRIEF DESCRIPTION OF THE DRAWINGS

These and other objects and features of the present invention will become clearer from the following description of the preferred embodiments given with reference to the accompanying drawings, in which:

FIG. 4 is a view of an example of correspondence of an air gap A, an interval h, an electrostatic capacitance Cg, and an oscillation frequency f;

DESCRIPTION OF THE PREFERRED EMBODIMENTS

Below, preferred embodiments will be described with reference to the accompanying drawings.

An optical disk drive will be explained as an example of a position controller and a recording/reproducing apparatus according to the present invention.

Optical Head

Figure 1:
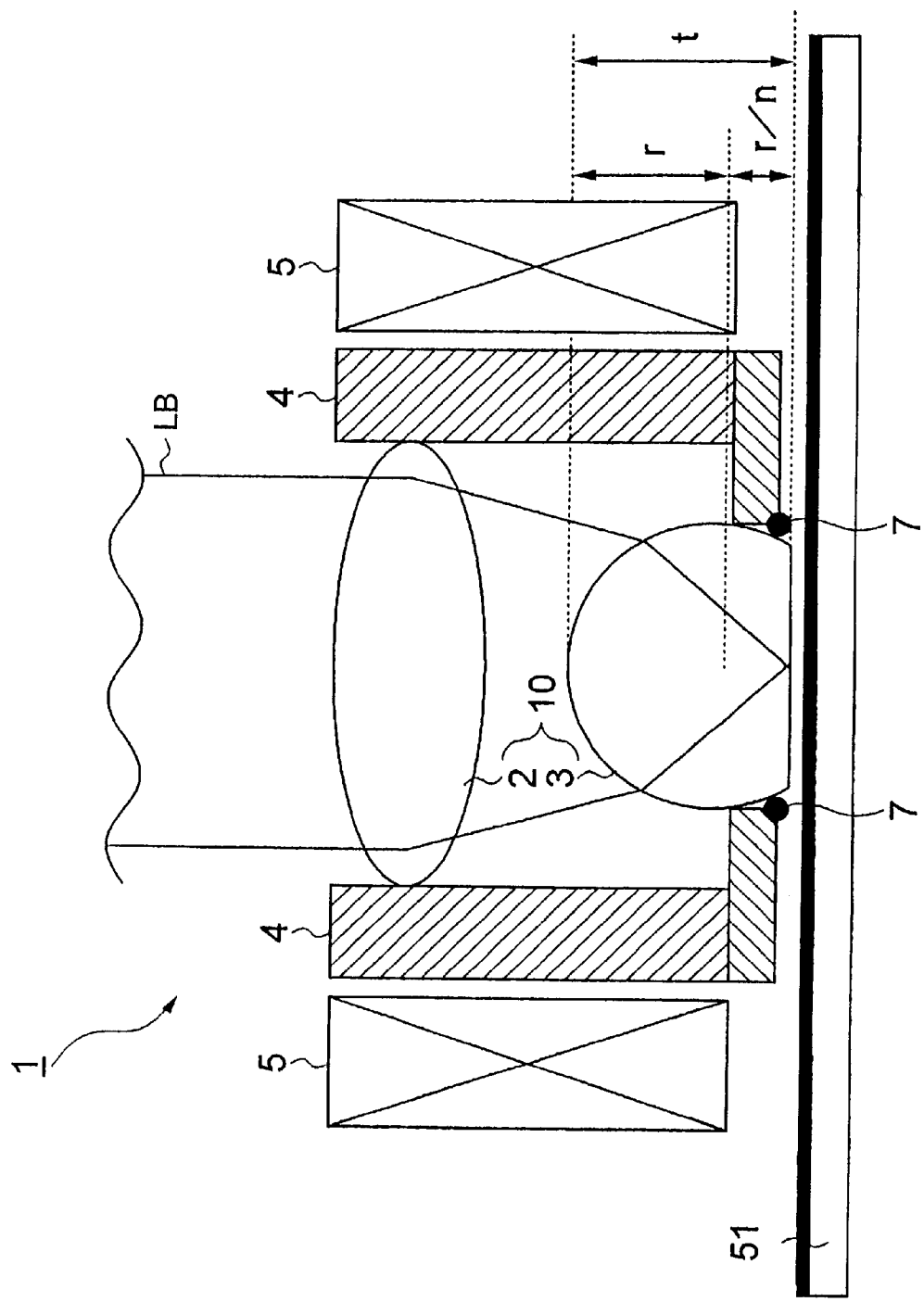
FIG. 1 is a view of an example of the configuration of an optical head.

FIG. 1 is a view of an example of the configuration of an optical head.

The optical head 1 is attached to an optical pickup of the above optical disk drive.

The optical head 1 comprises an object lens 2, a solid immersion lens (SIL) 3, a lens holder 4, and an electromagnetic actuator 5.

The object lens 2 is supplied with a laser beam LB from a semiconductor laser as a light source in the above optical pickup and converges the laser beam LB to supply it to the solid immersion lens 3.

The solid immersion lens 3 converges the laser beam LB transmitted through the object lens 2 to supply it to an optical disk 51.

The solid immersion lens 3 is a partially notched spherical shaped lens and generally called a "super sphere SIL" or "hyper sphere SIL".

The solid immersion lens 3 is arranged so that its spherical side faces the object lens 3 and that a surface of the opposite side (bottom surface) of the spherical side faces the optical disk 51.

The lens holder 4 integrally holds the object lens 2 and the solid immersion lens 3 in a predetermined positional relationship.

When a laser beam LB parallel with a light axis strikes the object lens 2, the solid immersion lens 3 converges the laser beam LB from the object lens 2 so that the light passes through a center portion of the bottom surface of the solid immersion lens 3 and focus the transmitted laser beam LB on the optical disk 51.

Note that the object lens 2 and the solid immersion lens 3 are arranged so that the optical axes are brought into register. The above center portion is positioned on the axis.

The lens holder 4 has a conductive member. On the bottom surface of the solid immersion lens 3 is formed a later explained conductive film. The conductive film on the above bottom surface and the conductive of the lens holder 4 are electrically connected via solder 7.

The electromagnetic actuator 5 moves the lens holder 4.

The electromagnetic actuator 5 comprises a not shown focusing actuator and a tracking actuator.

The focusing actuator moves the lens holder 4 in a focusing direction perpendicularly intersecting a recording surface of the optical disk 51 and holds the solid immersion lens 3 and the optical disk 51 at a predetermined distance.

The tracking actuator moves the lens holder 4 in a radius direction (or a tracking direction) of the optical disk 51 to keep the laser beam LB transmitted through the solid immersion disk 3 at the center of the track of the optical disk 51.

Note that the solid immersion lens 3 is designed to converge the laser beam LB in an aplanatic way to fulfil conditions of stigmatic focusing. The solid immersion lens 3 gathers the light of the laser beam LB from the object lens 2 so as to focus it on the recording surface of the optical disk 51.

A thickness t of the solid immersion lens 3 in the optical axis direction is expressed by the formula (2) below by using a radius r of the above spherical lens and a refractive index n.

$$t = r \times (1 + 1/n) \tag{2}$$

Also, according to Reference 2, the numerical aperture $NA_{eff}$ of the optical system 10 comprised of the object lens 2 and the solid immersion lens 3 is expressed by the formula (3) below by using a numerical aperture $NA_{obj}$ of the object lens 2 and a refractive index n of the solid immersion lens 3.

$$NA_{eff} = n^2 \times NA_{obj} \tag{3}$$

In the present embodiment, as an example, it is assumed that the numerical aperture $NA_{obj}$ of the object lens 2 is 0.45 and the refractive index n of the solid immersion lens 3 is 1.83.

In this case, the numerical aperture $NA_{eff}$ of the optical system 10 becomes ≈1.5 from the above formula (3).

Also, the wavelength λ of the laser beam LB is made λ=640 nm and an air gap A for forming a near-field is made 0<A≦100 nm as an example, preferably A≈50 nm is maintained.

Solid Immersion Lens

Figure 2:
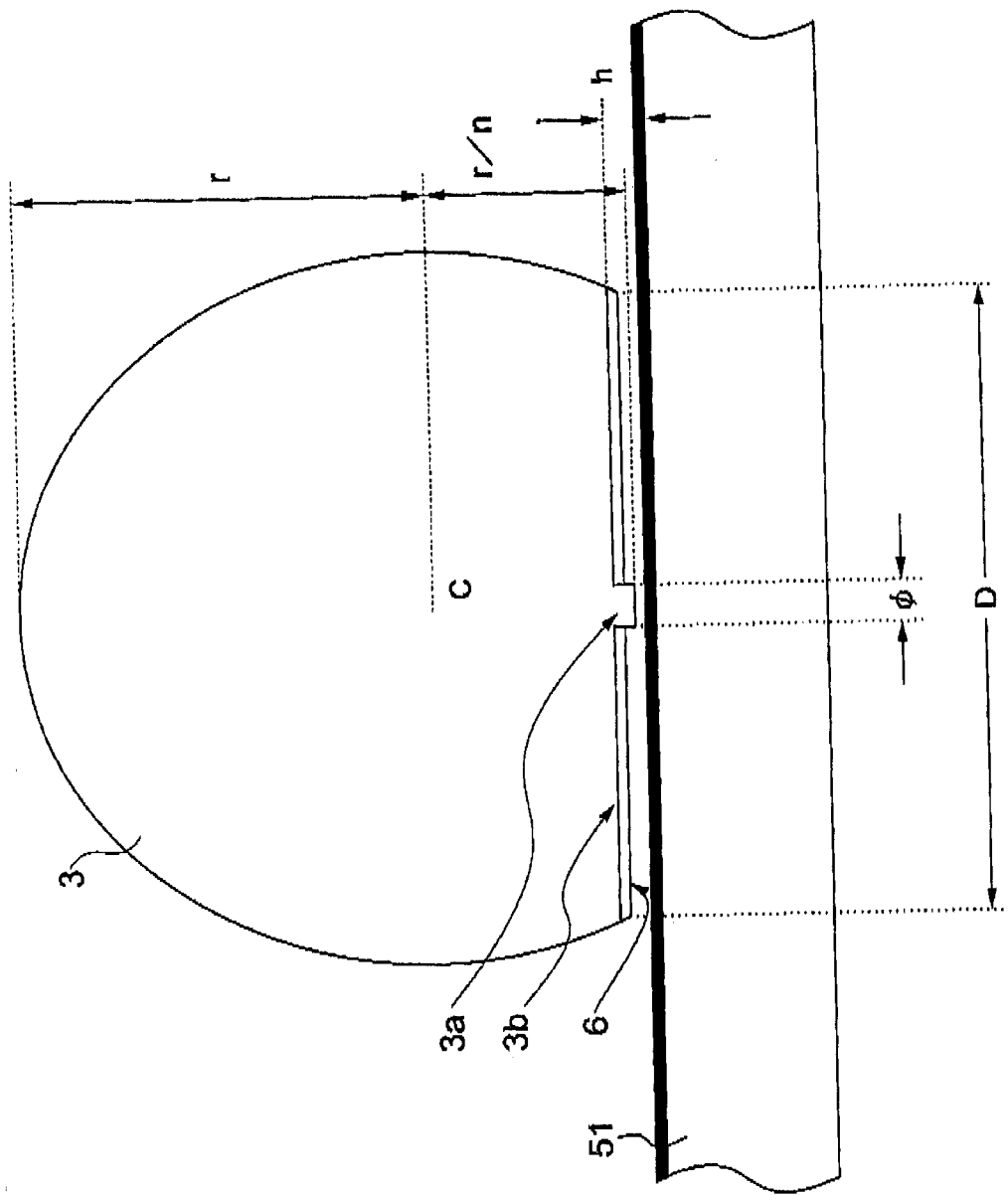
FIG. 2 is a view of an example of the configuration of a solid immersion lens.

FIG. 2 is a view of an example of the configuration of a solid immersion lens. The reference mark C indicates a center of the spherical lens.

The surface (bottom surface) of the solid immersion lens 3 facing the optical disk 51 has a diameter D of 1.5 mm, has a projected center portion 3a, and a flat peripheral portion 3b.

The projection at the center portion 3a has a height of about 2 μm and a diameter φ of ≈40 μm.

The flat surface of the peripheral portion 3b is covered by a conductive film 6 made of aluminum etc. formed by vapor deposition. The thickness of this conductive film is less than the height of the above projection (about 2 μm).

The conductive film 6 and the reflection film (recording film) made of aluminum etc. of the optical disk 51 form an electrostatic capacitance Cg in accordance with an interval H between the flat surface of the solid immersion lens 3 and the optical disk 51.

The electrostatic capacitance Cg is expressed by the formula (4) below by using a facing surface area S of the peripheral portion 3b and the optical disk 51 and the interval h. Note that the thickness of the above conductive film is assumed to be small enough to be able to be negligible compared with the interval h.

$$Cg = \epsilon_0 \times \epsilon_r \times S/h \tag{4}$$

Note that $\epsilon_0$ is a vacuum dielectric constant of a value of $8.854 \times 10^{-12}$ F/m. $\epsilon_r$ indicates a specific dielectric constant of a value of about 1 in air.

The facing surface area S becomes $S = \Pi \times (D/2)^2 \approx 1.767 \times 10^{-6}$ m² since the diameter D of the above bottom surface is D=1.5 mm.

The interval h becomes the minimum value 2 μm when the projection at the central portion 3a contacts the optical disk 51, namely, when the distance (air gap) A between the optical system 10 and the optical disk 51 is 0 nm.

The interval h respectively becomes 2.05 μm, 2.10 μm, and 2.20 μm when the air gap A is 50 nm, 100 nm, and 200 nm.

Accordingly, the electrostatic capacitance Cg at the time the air gap A is 0 nm, 50 nm, 100 nm, and 200 nm respectively becomes about 7.82 pF, about 7.63 pF, about 7.45 pF, and about 7.11 pF.

Since the electrostatic capacitance Cg changes in accordance with the air gap A in this way, the air gap A can be detected by using the electrostatic capacitance Cg. The air gap A can be made within the near-field range by servo control of an electromagnetic actuator 5 by using the electrostatic capacitance.

Furthermore, since the central portion 3a on the facing surface of the solid immersion lens 3 is made to project out and a conductive film 6 having a thickness less than the height of the projection is formed on the peripheral portion 3b, it is possible to prevent the conductive film 6 from becoming closer to the optical disk 51 than to the central portion 3a and contacting the optical disk 51.

Also, as shown in FIG. 1, since the conductive film 6 and the conductive lens holder 4 are electrically connected by the solder 7, interconnection to the conductive film 6 becomes easy via the lens holder 44.

Optical Disk Drive

Figure 3:
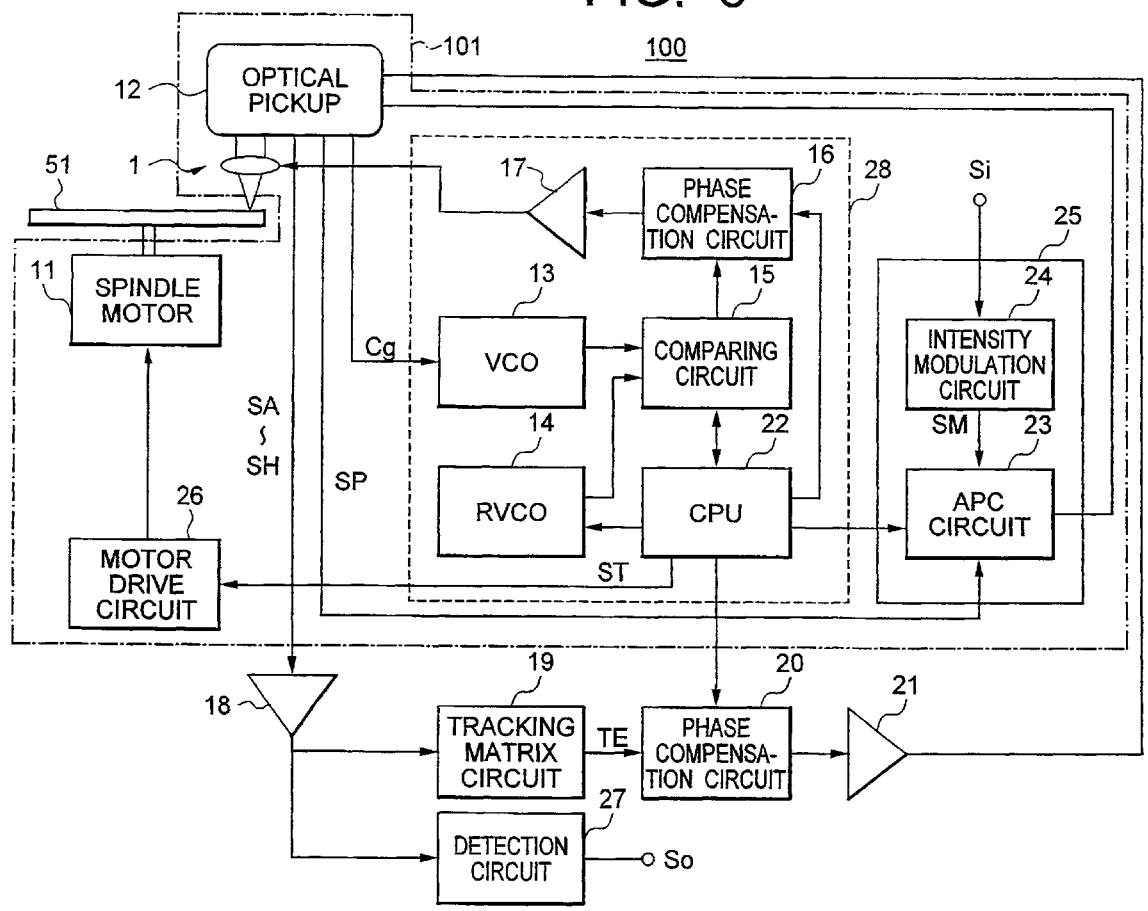
FIG. 3 is a schematic block diagram of the configuration of an optical disk drive as an example of a position controller and a recording/reproducing apparatus of an optical system according to the present invention.

FIG. 3 is a schematic block diagram of the configuration of an optical disk drive as an example of a position controller and recording/reproducing apparatus of an optical system according to the present invention. The optical disk drive 100 has an optical head 1 of FIG. 1 attached to an optical pickup.

The optical disk drive 100 is installed in a recording/reproducing apparatus for recording or reproducing information by focusing a laser beam from a semiconductor laser on an optical disk 51 via an optical system.

The optical disk drive 100 comprises an optical head 1, an optical pickup 12, a spindle motor 11, a voltage controlled oscillator (VCO) 13, a reference voltage controlled oscillator (RVCO) 14, a comparing circuit 15, phase compensation circuits 16 and 20, amplifying circuits 17, 18, and 21, a tracking matrix circuit 19, a central processing unit (CPU) 22, a semiconductor laser drive circuit 25, a motor drive circuit 26, and a detection circuit 27.

The semiconductor laser circuit 25 comprises an automatic power control (APC) circuit 23 and an intensity modulation circuit 24.

The optical disk drive 100 uses the optical head 1 and the optical pickup 12 to focus a laser beam having a wavelength of 640 nm on the optical disk 51 for recording or reproducing information.

The optical disk 51 installed in the optical disk drive 100 is rotated at a predetermined rotation speed by the spindle motor 11. The optical disk 51 may be configured so that information is recorded, for example, in a constant angular velocity (CAV) format or configured so that information is recorded in a constant linear velocity (CLV) format.

A signal processing system for focus servo is configured as follows.

The VCO (voltage controlled oscillator) 13 has an LC oscillation circuit provided with an internal inductor and an external capacitor.

One electrode of the external capacitor is a conductive film 6 formed on the flat surface of the solid immersion lens 3 of the optical head 1, while the other electrode is a reflection film or a recording film of the optical disk 51. The capacitor has an electrostatic capacitance Cg corresponding to the interval h between the above flat surface and the optical disk 51.

An oscillation frequency f of the VCO 13 is expressed by the formula (5) below by using the electrostatic capacitance Cg of the above external capacitor, a floating capacitance Cf of the circuit, and an inductance L of the above internal inductor.

$$f = 1/[2\Pi \times \{L \times (Cg + Cf)\}^{1/2}] \tag{5}$$

The correspondence between the air gap A, interval h, electrostatic capacitance Cg, and oscillation frequency f is shown in FIG. 4. Here, as an example, it is assumed that the inductance L is 100 μH and the floating capacitance Cf is 5 pF.

Namely, when the air gap A is 0 nm, 50 nm, 100 nm, 200 nm, and 10 μm, the oscillation frequency f respectively becomes about 4.45 MHz, about 4.48 MHz, about 4.51 MHz, about 4.57 MHz, and about 6.34 MHz from the above formula (5).

The reference voltage controlled oscillator (RVCO) 14 generates a reference signal.

A frequency fr of the reference signal is, for example, 4.48 MHz or equal to the oscillation frequency of the VCO 13 at the case where the air gap A is 50 nm.

Note that the RVCO 14 comprises, for example, a varactor diode. By controlling the voltage applied to the varactor diode by the CPU 22, the frequency fr of the reference signal can be set.

The comparing circuit 15 is supplied with an output signal having the frequency f from the VCO 13 and an output signal having the frequency fr from the RVCO.

The comparing circuit 15 compares the frequency and phase of the output signal of the VCO 13 with those of the output signal of the RVCO 14 and generates a signal (error signal) in accordance with the difference between the two frequencies and phases.

The phase compensation circuit 16 is supplied with the output signal from the comparator 15, generates a compensation signal for compensating (phase compensation and/or frequency compensation) the output signal from the comparing circuit 15, and supplies the same to the amplifying circuit 17.

The amplifying circuit 17 amplifies the above compensation signal and supplies it as a control signal for adjusting the air gap A to the focusing actuator of the electromagnetic actuator 5.

The above focusing actuator moves the lens holder 4 in the focus direction based on the control signal from the amplifying circuit 17 so that the air gap A outside the range forming a near-field is made within the range and furthermore keeps the air gap A in the range.

As explained above, the air gap A is maintained at $0<A\leq100$ nm and is adjusted to $A\approx50$ nm, the interval h is adjusted to 2.05 µm, and focus servo is realized.

The CPU 22 is a controller in charge of overall control of the optical disk drive 100 and is configured for example by a one-chip microcomputer.

The CPU 22 is supplied with the output signal from the comparing circuit 15. Based thereon, it detects that the air gap A is maintained within the near-field range (range where near-field is formed), generates a starting signal ST, and supplies the starting signal ST to the motor drive circuit 26.

Also, the CPU 22 is supplied with a signal indicating the rotation number and rotation speed of the spindle motor 11 or the optical disk 51.

Tracking servo and focusing servo are performed under the control of the CPU 22.

The control circuit 28 is comprised by the CPU 22, VCO 13, RVCO 14, comparing circuit 15, phase compensation circuit 16, and amplifying circuit 17.

Note that the position controller 101 of the optical system is comprised by the control circuit 28, optical head 1, optical pickup 12, semiconductor laser drive circuit 25, motor drive circuit 26, and motor 11.

The control circuit 28 has the function of controlling the electromagnetic actuator 5 so that the air gap A becomes within the near-field range (for example, $0<A\leq200$ nm, preferably, $0<A\leq100$ nm).

By making the air gap A within the near-field range, it becomes possible to maintain the beam intensity at the center of a beam spot on the recording surface of the optical disk 51 to for example 50% or more (preferably, 60% or more) in the case where A=0 nm. As an example, it is possible to obtain a beam intensity of 80% or more by keeping the air gap A about 50 nm.

The motor drive circuit 26 supplies power (drive electric power) to the spindle motor 11 to make it rotate at a predetermined rotation speed. For instance, the rotation control may be performed by pulse width modulation (PWM) control or by phase locked loop (PLL) control.

The motor drive circuit 26 starts to rotate the spindle motor 11 when a starting signal ST is supplied from the CPU 22.

A not shown turntable is attached on the shaft of the spindle motor 11. The optical disk 51 on the turntable rotates as the spindle motor 11 rotates.

Figure 5:
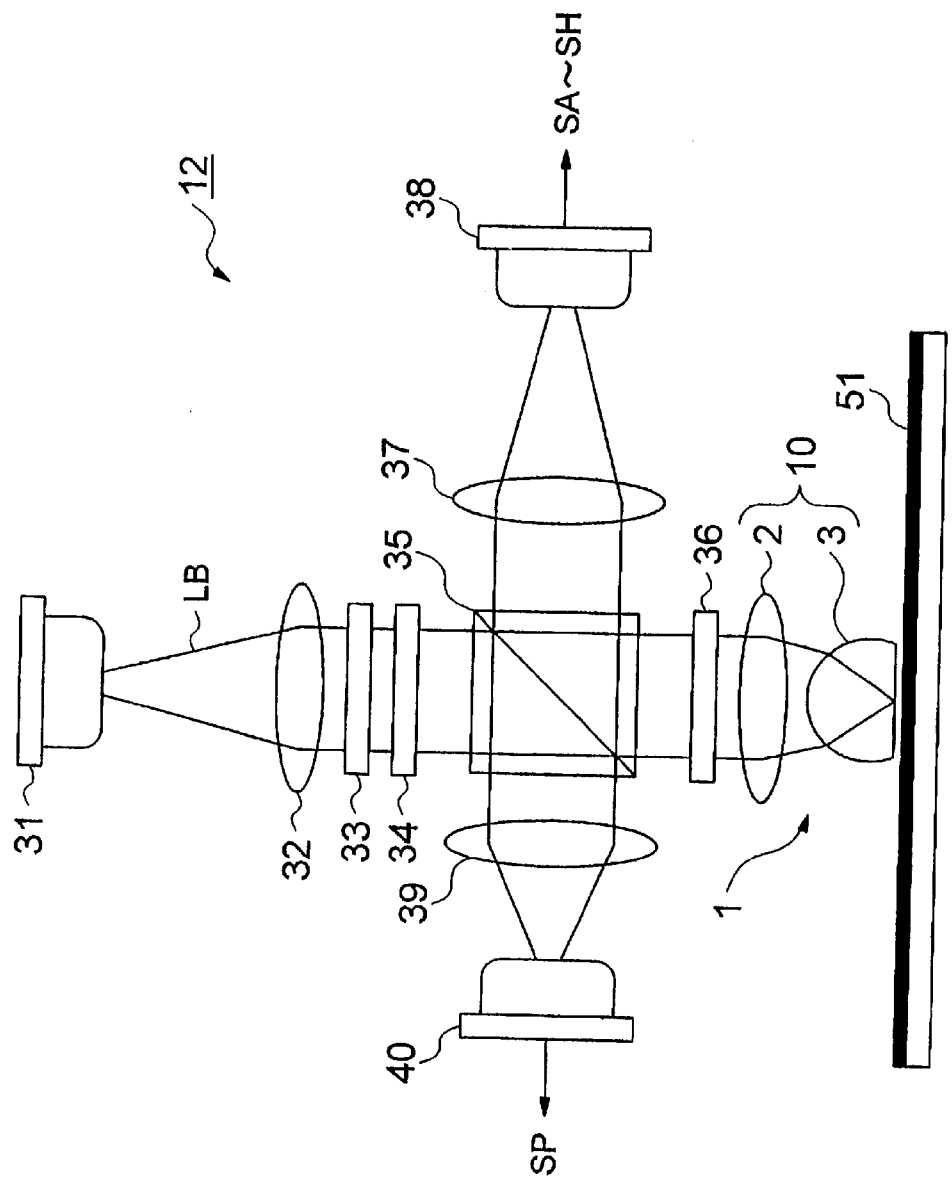
FIG. 5 is a view of an example of the configuration of an optical pickup.

FIG. 5 is a view of an example of the configuration of the optical pickup 12.

The optical pickup 12 comprises a semiconductor laser 31, a collimator lens 32, a diffraction grating 33, a ½ wavelength plate 34, a polarized beam splitter 35, a ¼ wavelength plate 36, convergence lenses 37 and 39, light detectors 38 and 40, an object lens 2, and a solid immersion lens 3.

The optical pickup 12 has an optical head 1 attached to it. The optical head 1 has an optical system 10 comprising an object lens 2 and a solid immersion lens 3.

The semiconductor laser 31 is an example of a light source and light emitting element for emitting coherent light. The semiconductor laser 31 generates a laser beam LB of linear polarized light having a wavelength of 640 nm and supplies the laser beam LB to the collimator lens 32.

The collimator lens 32 makes the laser beam LB from the semiconductor laser 31 a parallel light which it supplies to the diffraction grating 33.

The diffraction grating 33 separates the laser beam LB from the collimator 32 into a main beam (0th diffraction light) and a sub beam (first diffraction light) and supplies the two to the ½ wavelength plate 34.

The ½ wavelength plate 34 rotates polarization planes of the main beam and the sub beam from the diffraction grating 33 and supplies the results to the polarization beam splitter 35.

The polarization beam splitter 35 lets a large part of the incident laser beam from the ½ wavelength plate 34 pass through it to be supplied to the ¼ wavelength plate 36 and reflects part of the incident beam for supply to the convergence lens 39.

The convergence lens 39 converges the reflected laser beam from the polarization beam splitter 35 to supply it to the light detector 40.

The light detector 40 performs photoelectric conversion on the laser beam from the convergence lens 39 to generate a signal SP corresponding to the laser beam intensity. The light detector 40 is used for monitoring the light emitting intensity of the semiconductor laser 31 or monitoring the beam intensity on the recording surface.(recording film) of the optical disk 51.

Note that the amount of the laser beam striking the light detector 40 is adjustable by rotating the ½ wavelength plate 34 to a predetermined rotation angle.

The ¼ wavelength plate 36 rotates the polarization plane of the transmitting laser beam of the polarization beam splitter 35 to circular polarization and supplies the circularly polarized laser beam to the object lens 2 of the optical head 1.

The object lens 2 converges the laser beam from the ¼ wavelength plate 36 to supply it to the solid immersion lens 3.

The solid immersion lens 3 converges the laser beams from the object lens 2 to make it pass through the central portion 3a and supplies the transmitted laser beam to the signal recording surface of the optical disk 51.

The laser beam reflected on the signal recording surface (recording film) of the optical disk 51 is supplied to the ¼ wavelength plate 36 through the solid immersion lens 3 and the object lens 2.

The ¼ wavelength plate 36 rotates the polarization plane of the laser beam from the object lens 2 to linear polarization and supplies the linear polarized laser beam to the polarization beam splitter 35.

Note that the polarization plane of the incident laser beam supplied from the polarization beam splitter 35 to the ¼ wavelength plate 36 and the polarization plane of the reflected laser beam supplied from the ¼ wavelength plate 36 to the polarization beam splitter 35 are made to perpendicularly intersect.

The polarization beam splitter 35 reflects the laser beam from the ¼ wavelength plate 36 to supply it to the convergence lens 37.

The convergence lens 37 converges the reflected laser beam from the polarization beam splitter 35 to supply it to the light detector 38.

The light detector 38 performs photoelectric conversion on the laser beam from the convergence lens 37 to generate signals SA to SH. The light detector 38 is used for detecting a tracking error signal TE and a reproduction RF signal.

Figure 6:
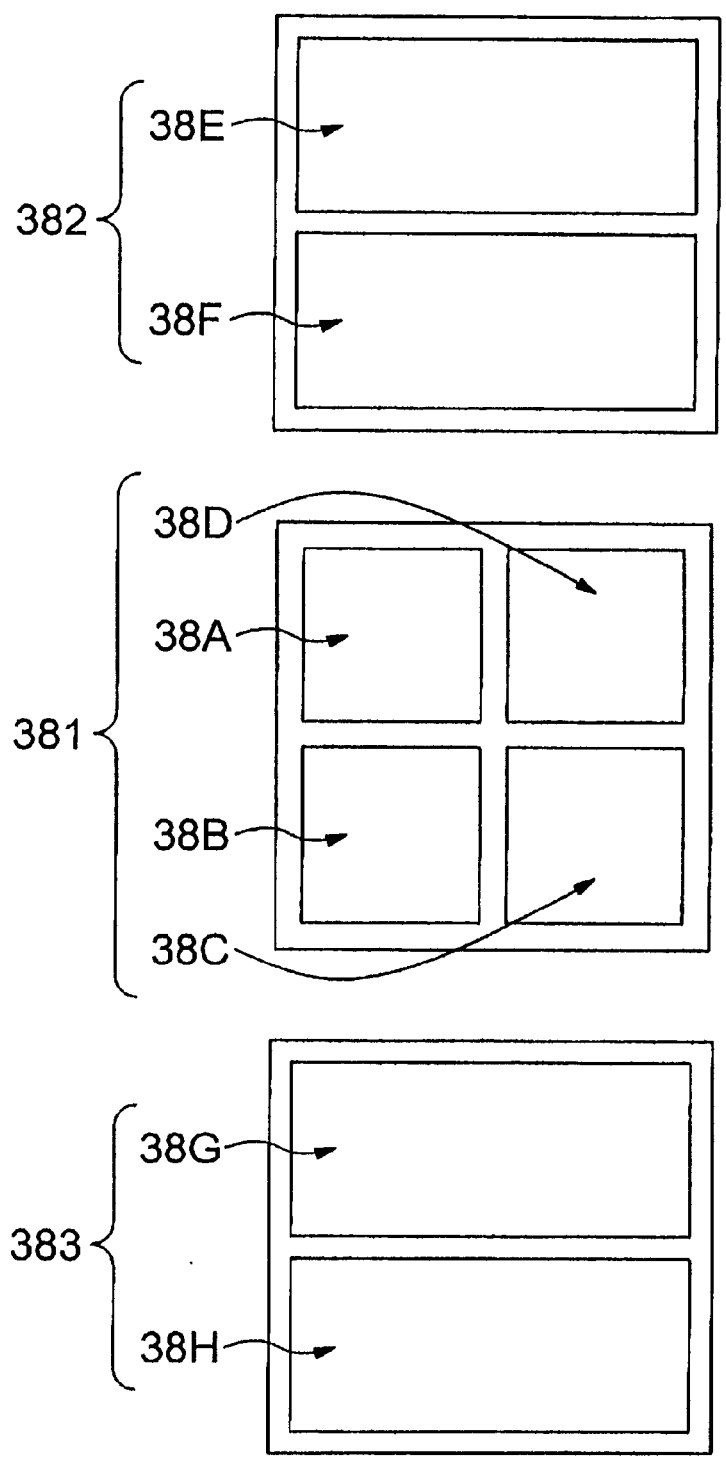
FIG. 6 is a view of an example of an arrangement of a light reception portion of an optical detector 38.

The light detector 38, as shown in FIG. 6, has a first light receiving portion 381 for receiving the main beam arranged at its center and has a second light receiving portion 382 and a third light receiving portion 383 for receiving the sub beam arranged at the two sides of the first light receiving portion 381.

The first light receiving portion 381 is equally divided into four light receiving portions 38A to 38D.

The second light receiving portion 382 is equally divided into two light receiving portions 38E and 38F.

The third light receiving portion 383 is equally divided into two light receiving portions 38G and 38H.

The light detector 38 may be formed by a light receiving portion equally divided into eight light receiving elements.

The output signals SA to SH of the respective light receiving portions 38A to 38H of the light detector 38 are amplified in the amplifying circuit (head amplifier) 18 in FIG. 3 and supplied to a tracking matrix circuit (tracking error detection circuit) 19 and detection circuit 27.

The tracking matrix circuit 19 performs the operation of the formula (6) based on the amplified output signals SA to SH and generates a tracking error signal TE by using a differential push-pull (DPP) method. Note that k in the formula indicates a constant.

$$TE=(SA+SD)-(SB+SC)+k\times\{(SE-SF)+(SG-SH)\} \quad (6)$$

The phase compensation circuit 20 is supplied with the above tracking error signal TE, generates a compensation signal obtained by compensation of the tracking error signal TE, and supplies the same to the amplifying circuit 21.

The amplifier 21 amplifies the compensation signal and supplies the same as a control signal to the tracking actuator of the electromagnetic actuator 5.

The tracking actuator moves the lens holder 4 in the radius direction (or the tracking direction) of the optical disk 51 based on the control signal from the amplifier 21. As a result, tracking servo is realized.

The detection circuit (information detection circuit) 27 generates a reproduction signal RF by performing the operation of formula (7) based on the output signals SA to SD amplified by the amplifying circuit (head amplifier) 18. It performs demodulation etc. based on the reproducing signal RF to reproduce recorded information $S_0$ of the optical disk 51.

$$RF=SA+SB+SC+SD \quad (7)$$

The semiconductor laser drive 25 comprises an intensity modulation circuit 24 and an automatic power control (APC) circuit 23 and drives a semiconductor laser 31 in the optical pickup 12.

The intensity modulation circuit 24 is supplied with information Si to be recorded on the optical disk 51 from a memory or an external device etc. and generates a modulation control signal SM in accordance with the input information Si.

The APC circuit 23 is supplied with an output signal SP of the monitoring use light detector 40 in the optical pickup 12 and the modulation control signal SM.

At the time of recording information, the APC circuit 23 changes a drive voltage or drive current of the semiconductor laser 31 based on the modulation control signal SM to modulate the intensity of the laser beam LB by or maintains the emission intensity of the semiconductor laser 31 within a first set range RI based on the output signal SP of the light detector 40 to adjust a laser beam output of the semiconductor laser 31.

When reproducing information, the APC circuit 23 keeps the emission intensity of the semiconductor laser 31 within a second set range R2 (<R1) based on the output signal SP from the light detector 40 to adjust the laser beam output of the semiconductor laser 31.

Example of Operation of Optical Disk Drive

Figure 7:
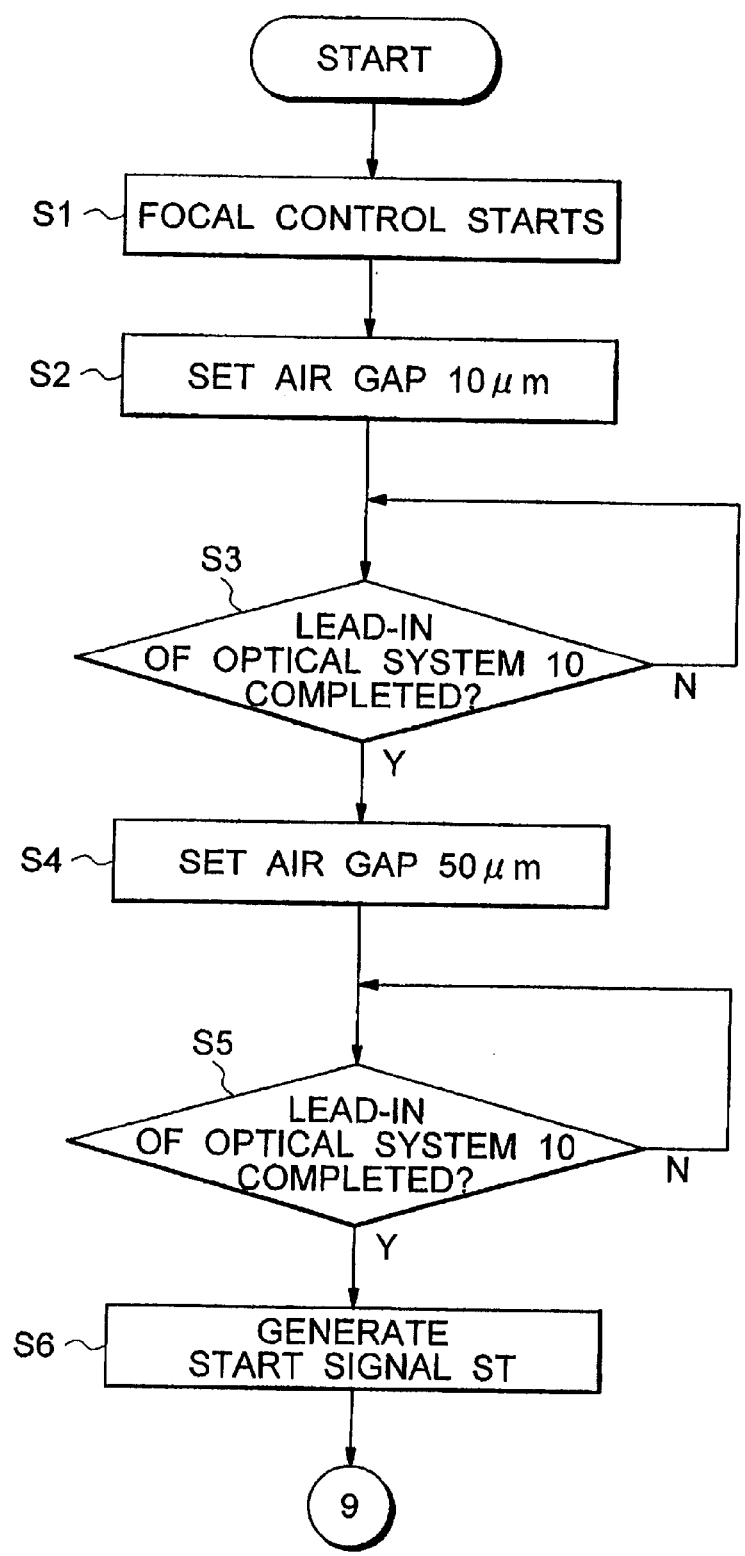
FIG. 7 is a schematic flow chart of an operation of the optical disk drive in FIG. 3.
Figure 8:
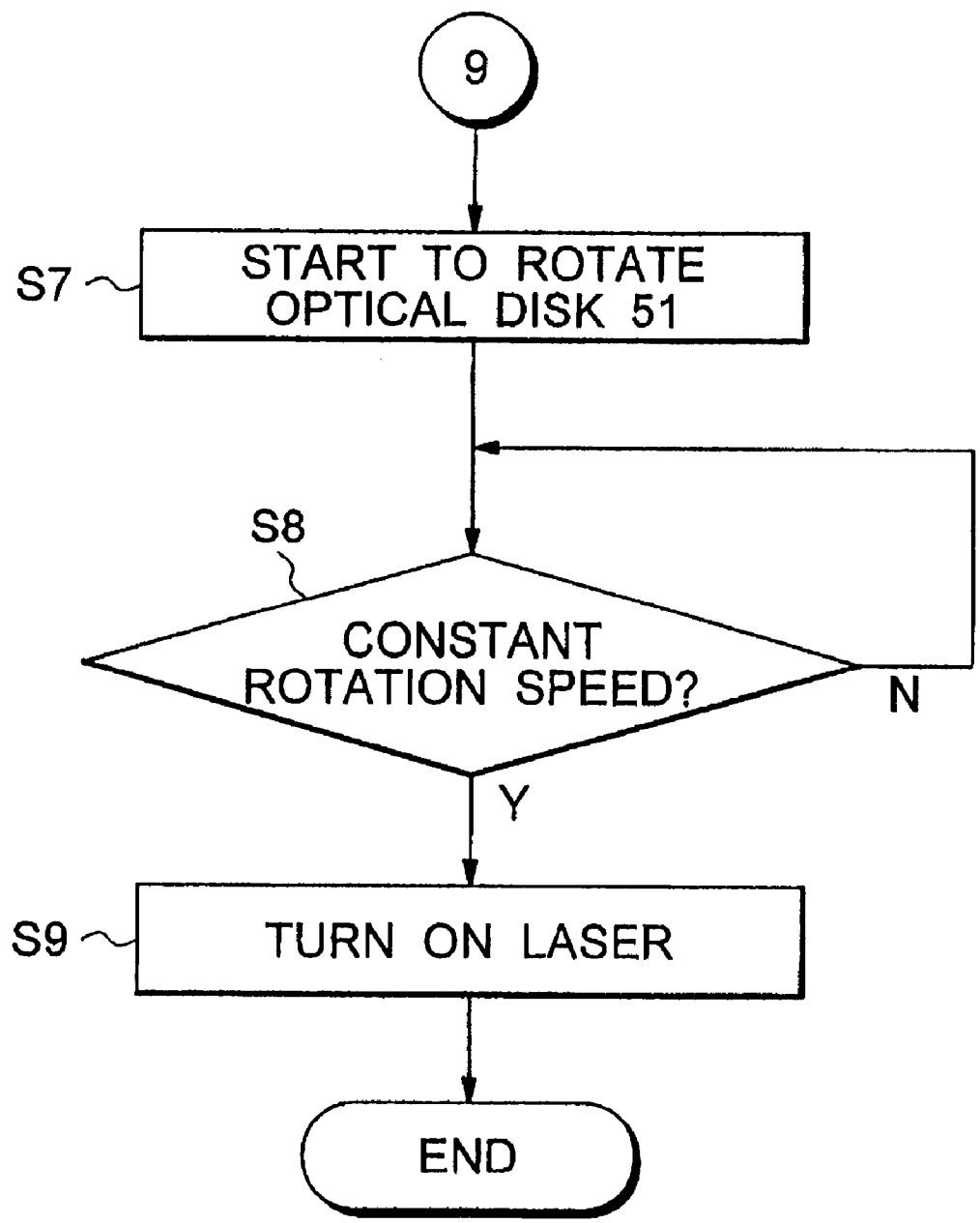
FIG. 8 is a schematic flow chart of an operation of the optical disk drive in FIG. 3 continued from FIG. 7.

FIGS. 7 and 8 are schematic flow charts of the operation of the optical disk drive 100 and schematic flow charts of a position control method of an optical system and a method of driving a recording/reproducing apparatus according to the present invention.

First, at step S1, the CPU 22 detects a start instruction of a focus servo. For example, the start instruction is supplied to the CPU 22 by an operation for switching between recording or reproduction by an operator on a recording/reproducing apparatus provided with the optical drive apparatus 100.

Note that the air gap A at this time is an initial setting outside of a near-field range.

Next, at step S2, the CPU 22 sets an oscillation frequency fr of the RVCO 14 at about 6.34 MHz and a target value of the air gap A at 10 μm as an intermediate target value. It starts to drive the electromagnetic actuator 5 and starts to pull in (focus) the solid immersion lens 3 (or an optical system 10).

The oscillation frequency fr of 6.34 MHz is, as shown in FIG. 4, equal to an oscillation frequency f of the VCO 13 when the air gap A is 10 μm.

At step S3, the CPU 22 Judges whether or not the pull-in operation for making the air gap A 10 μm or substantially 10 μm is completed based on the output signal from the comparing circuit 15.

When the pull-in is not completed, the completion is waited for.

When the pull-in is completed, the air gap A is maintained at the intermediate target value (10 μm) or substantially at the intermediate target value, so the processing proceeds to step S4.

At step S4, the CPU 22 sets the oscillation frequency fr of the RVCO 14 at 4.48 MHz and the target value of the air gap A at 50 nm as the final target value. Then, it further pulls in (focuses) the solid immersion lens 3 (or the optical system 10) by the electromagnetic actuator 5.

The oscillation frequency fr of 4.48 MHz is equal to the oscillation frequency f of the VCO 13 at the time when the air gap A is 50 nm as shown in FIG. 4.

Note that it is possible to divide the range between 6.34 MHz and 4.48 MHz into a plurality of stages and gradually reduce the oscillation frequency fr in stages so as to track the oscillation frequency f of the VCO 13, consequently the air gap A can be gradually reduced.

At step S5, the CPU 22 judges whether or not the pull-in operation (focusing operation) for making the air gap A 50 nm or substantially 50 nm is completed based on the output signal from the comparing circuit 15.

When the pull-in is not completed, the completion is waited for.

When the pull-in is completed, the processing proceeds to step S6. At this time, the air gap A is maintained at the final target value (50 nm) or at a substantial final target value and within a near-field range.

At step S6, the CPU 22 generates a start signal ST which it supplies to the motor drive circuit 26.

At step S7, the motor drive circuit 26 starts to supply current to the spindle motor 11 (supply of drive power) based on the start signal and starts to rotate the optical disk 51.

At step S8, the CPU 22 judges whether or not the rotation speed of the optical disk 51 (disk rotation speed V) is a predetermined constant rotation speed Vc (>0).

When the disk rotation speed V is not a constant rotation speed Vc, the CPU 22 controls the rotation of the spindle motor 11 via the motor drive circuit 26 to a constant rotation speed Vc.

When the disk rotation speed V is a constant rotation speed Vc, the processing proceeds to step S9.

At step S9, the CPU 22 supplies a power-on signal to the APC circuit 23 inside the semiconductor laser drive circuit 25. The APC circuit 23 turns on the semiconductor laser 31 to output the laser beam LB.

If the semiconductor laser 31 is turned on while the optical disk 51 is stopped, the laser beam may be focused on a specific portion of the optical disk 51 for a long time at the time of pull-in (focusing) of the solid immersion lens 3 and the location focused on may becomes a high temperature. The characteristics of the location focused on may therefore change.

On the other hand, as described in the present embodiment, by turning on the semiconductor laser 31 after rotating the optical disk 51, it becomes possible to prevent a specific portion of the optical disk from becoming a high temperature due to the laser beam being focused on it for a long time when pulling in the solid immersion lens 3.

As explained above, according to the optical disk drive 100, a numerical aperture exceeding 1 can be obtained by using the solid immersion lens 3. Further, the air gap A can be controlled to a predetermined value (for example, about 50 nm) within the near-field by a high accuracy based on the electrostatic capacitance Cg. Note that the numerical aperture of the optical system 10 may be for example larger than 1 but not larger than 3 or larger than 1 but not larger than 2.5.

Since the conductive film 6 was formed on the bottom surface of the solid immersion lens 3, the interval between the conductive film 6 and the optical disk 51 can be made smaller and the electrostatic capacitance Cg can be larger. It becomes possible to further accurately perform focus servo.

Also, since the control circuit 28 controls the electromagnetic actuator 5 so that the air gap A becomes shorter in stages from outside the near-field range to inside it, it is possible to prevent the optical system 10 and the optical disk 51 from contacting and the impact can be kept small in the unlikely event they contact.

The control circuit 28 controls the electro-magnetic actuator 5 to set and temporarily hold the air gap A at an intermediate target value from an initial setting outside the near-field range and to then bring it from the intermediate target value close to the final target within the near-field range so as to shorten the air gap A shorter in stages, keep the amount of overshoot small when it occurs, and keep the impact small in the unlikely event of contact.

Note that it is also possible to set a plurality of intermediate target values from the initial setting outside the near-field to the final target value within the near-field range and successively go through the plurality of intermediate target values so as to make the air gap A gradually approach the final target value. For example, it is possible to set the plurality of intermediate target values in a range where the electrostatic capacitance Cg is substantially formed (about 10 $\mu$m to 100 $\mu$m as an example).

Further, according to the optical disk drive 100, when pulling in the optical system 10 to a close distance within the near-field, the optical disk 51 can be made to stop.

Due to this, in the unlikely event the optical system 10 and the optical disk 51 contact, the contact area and the impact can be made smaller compared with a case where the optical disk 51 is rotating.

In the above embodiment, the optical system 10 was formed by the object lens 2 and the solid immersion lens 3 and the optical system 10 having the numerical aperture of about 1.5 was provided on the optical head 1.

However, the optical head 1 may also be provided with an optical system consisting of one optical element comprised of the object lens 2 and the solid immersion lens 3 made integral.

As such an integral optical element, for example, a reflection type convergence element disclosed in Chul Woo Lee, Kun Ho Cho, Chong Sam Chung, Jang Hoon Yoo, and Yong Hoon Lee, "Feasibility study on near field optical memory using a catadioptric optical system," Digest of Optical Data Storage, pp.137–139, Aspen, Co. (1998) may be used.

Also, as an optical element having the function of an object lens 2 and an optical element having the function of a solid immersion lens, three or more optical elements may be provided at the optical head 1 or a hologram element may be provided at the optical head 1.

In the present embodiment, a phase-change type optical disk 51 is used as an example of an optical recording medium, but with the position controller of an optical system according to the present invention, a magneto-optical disk may also be used as the optical recording medium.

Furthermore, even in the case of using a passive optical head using a floating slider, it is also possible to detect a floating amount equivalent to the air gap A and to optimize the floating amount from the electrostatic capacitance Cg.

Note that the radius of the facing surface of the solid immersion lens 3 (or the optical system 10) formed with the conductive film 6 is preferably made a positive value smaller than the width from an inner edge of the recording surface of the optical disk 51 to a track of the innermost circumference and is made a positive value smaller than the width from the outer edge of the recording surface of the optical disk 51 to a track of the outermost circumference.

By doing so, when converging the laser beam LB on the track of the innermost circumference and when converging the laser beam LB on the track of the outermost circumference, it is possible to make the entire bottom surface of the solid immersion lens 3 face the recording surface and make the fluctuation of the electrostatic capacitance Cg due to convergence positions.

In the present embodiment, as an example of a position controller of an optical system and a recording/reproducing apparatus, the optical disk drive 100 was explained.

The position controller of an optical system according to the present embodiment is useful under conditions of high coherence of a light source and a small working distance of an optical system (or an object lens), namely, in an optical apparatus wherein an interference pattern easily arises.

In such an optical apparatus, error easily occurs in focal control by an optical means due to an intensity distribution by an optical interference, while in the above optical disk drive 100, error can be made small by focal control using an output signal (electric signal) of an LC oscillation circuit.

The above optical disk drive 100 may be applied to a variety of light emitting apparatuses for emitting light other than recording/reproducing apparatuses, for example, it may be applied to a processing apparatuses, exposure apparatuses, inspection apparatuses, etc.

For example, when inspecting samples of metals, semiconductor wafers, etc. by using an optical inspection apparatus, focal control can be performed based on an electrostatic capacitance between the optical system 10 and the samples. Optical recording medium of course may also be used as samples.

When it is necessary to speedily inspect the entire region of a sample as in an inspection apparatus of semiconductor wafers, focal control based on the electrostatic capacitance between the optical system 10 and the sample enables position correction of an optical system in accordance with the inclination of a movable stage or sample and enables the time required for inspection to be shortened.

Note that the above embodiments are examples of the present invention. The present invention is not limited to them.

Summarizing the effects of the invention, with the position controller and position control method of an optical system, recording/reproducing apparatus, and driving method of the present invention, by shortening the distance (air gap) between an optical system and an optical recording medium from the outside to the inside of the region where the near-field is formed and keeping the distance within the range, it is possible to efficiently focus light from the near-field optical system to an optical recording medium.

Also, with the position controller and position control method of an optical system according to the present invention, by making the optical recording medium rotate after the distance between the optical system and optical recording medium is maintained in the near-field region, it is possible to stop the optical recording medium when shortening the distance to form a near-field.

Due to this, when the optical system and the optical recording medium contact, the contact area and the impact can be made smaller comparing with the case where the optical recording medium is rotating, so the reliability and durability of the optical recording media and the position controller of the optical system can be improved.

Furthermore, with the position controller and position control method according to the present invention, by supplying the laser beam to the optical system after the optical recording medium is rotating, it is possible to prevent the laser beam from being focused on a specific location of the optical recording medium for a long time when shortening the distance to form a near-field and possible to further improve the reliability and durability of the optical recording medium.

Also, with the position controller and position control method of an optical system according to the present invention, by shortening the air gap in stages from outside to inside a near-field range, it is possible to prevent the optical system and the optical recording medium from contacting and possible to improve the reliability and durability of the optical system and the optical recording medium.

For example, by setting and temporarily holding the air gap at an Intermediate target value from an initial setting outside of the near-field and bringing it from the intermediate target value close to the final target value inside the near-field range, it is possible to shorten the air gap in stages, possible to make the amount of overshoot small when it occurs, and possible to keep the impact in the unlikely event of contact small.

Also, with the recording/reproducing apparatus and the driving method according to the present invention, by making the optical recording medium rotate after maintaining the distance between the optical system and the optical recording medium within the near-field range, it is possible to stop the optical recording medium when shortening the distance between the optical system and the optical recording medium to form the near-field.

Due to this, if the optical system contacts the optical recording medium, it is possible to reduce the contact area and impact comparing with the case where the optical recording medium is rotating and it is possible to improve the reliability and durability of the optical recording medium and recording/reproducing apparatus and the reliability of the recorded information and reproduced information.

Furthermore, with the recording/reproducing apparatus and the driving method according to the present invention, by supplying the laser be am to the optical system after the optical recording medium is rotating, it is possible to prevent the laser beam from being focused on a specific location of the optical recording medium for a long time when shortening the distance between the optical system and the optical recording medium to form the near-field and it is possible to further improve the reliability and durability of the optical recording medium and reliability of the recorded information and reproduced information.

Also, with the recording/reproducing apparatus and the driving method according to the present invention, by shortening the air gap in stages from outside to inside the near-field range, it is possible to prevent contact of the optical system and the optical recording medium and it is possible to improve the reliability and durability of the optical system and the optical recording medium and the reliability of recorded information and reproduced information.

For example, by setting and temporarily holding the air gap at an intermediate target value from an initial setting outside of the near-field and bringing it from the intermediate target value close to the final target value inside the near-field range, it is possible to shorten the air gap in stages, possible to make the amount of overshoot small when it occurs, and possible to keep the impact in the unlikely event of contact small.

While the invention has been described with reference to specific embodiment chosen for purpose of illustration, it should be apparent that numerous modifications could be made thereto by those skilled in the art without departing from the basic concept and scope of the invention.

What is claimed is:

1. A position controller of an optical system comprising:
   an optical system for forming a near-field with an optical recording medium and focusing converged light to the optical recording medium;
   an actuator for moving said optical system in a focal direction perpendicularly intersecting a recording surface of said optical recording medium; and
   a control circuit for controlling said actuator so as to shorten the distance between said optical system and said optical recording medium from outside to inside the range where said near-field is formed and further maintain it inside the range, wherein said control circuit controls said actuator so as to shorten the distance between said optical system and said optical recording medium in stages from outside to inside the range where said near-field is formed and further maintain it within said range.

2. A position controller of an optical system as set forth in claim 1, wherein said control circuit controls said actuator to set said distance to an intermediate target value from an initial setting outside of said range, temporarily maintain it at said intermediate target value or substantially said intermediate target value, and bring it close from the intermediate target value to a final target value inside of said range.

3. A position controller of an optical system as set forth in claim 1, further comprising:

a motor for rotating said optical recording medium;

said control circuit generating a starting signal after said distance is kept inside said range, and said motor starting to rotate said optical recording medium based on said starting signal.

4. A position controller of an optical system as set forth in claim 3, further comprising a laser for supplying a laser beam to said optical system after said optical recording medium rotates.

5. A position controller of an optical system as set forth in claim 1, wherein said optical system comprises a first optical system having an object lens for converging light and a solid immersion lens for converging light passing through the object lens and focusing it on said optical recording system or a second optical system wherein said object lens and said solid immersion lens are made integral.

6. A position controller of an optical system as set forth in claim 5, wherein:

said optical recording medium is an optical disk;

said solid immersion lens has a central portion on a surface facing said optical disk which projects out, has a peripheral portion which is flat and formed with a conductive film, and converges light passing through said object lens and passes it through said central portion; and said control circuit controls said actuator based on an electrostatic capacitance between said conductive film and said optical disk to adjust said distance.

7. A position controller of an optical system as set forth in claim 1, wherein:

the numerical aperture of said optical system is larger than 1 and equal or smaller than 3; and a range wherein said near-field is formed is a range wherein said optical system and said optical recording medium are in a non-contacting state and said distance is 500 nm or less.

8. A position control method of an optical system for controlling a distance from an optical system for forming a near-field with an optical recording medium and focusing converged light to the optical recording medium to said optical recording medium, including the steps of:

shortening the distance between said optical system and said optical recording medium from outside to inside a range where said near-field is formed; and maintaining said distance within said range, wherein said distance is shortened in stages from outside to inside the range where said near-field is formed.

9. A position control method of an optical system as set forth in claim 8, wherein said shortening step includes the steps of:

setting said distance from an initial setting outside the range to an intermediate target value and maintaining it at said intermediate target value or substantial intermediate target value; and making said distance from said intermediate target value to a final target value inside said range.

10. A position control method of an optical system as set forth in claim 8, further including a step of rotating said optical recording medium after said distance is maintained inside said range.

11. A position control method of an optical system as set forth in claim 10, further including a step of supplying a laser beam to said optical system after said optical recording medium is rotating.

12. A position control method of an optical system as set forth in claim 8, wherein:

the numerical aperture of said optical system is larger than 1 and equal or smaller than 3; and the range wherein said near-field is formed is a range wherein said optical system and said optical recording medium are in a non-contacting state and said distance is 500 nm or less.

13. A recording/reproducing apparatus comprising:

a light source;

an optical system for forming a near-field with an optical recording medium, converging a light from said light source, and focusing it to said optical recording medium;

an actuator for moving said optical system in a focal direction perpendicularly intersecting a recording surface of said optical recording medium;

a control circuit for controlling said actuator so as to shorten the distance between said optical system and said optical recording medium from outside to inside the range where said near-field is formed and further maintain it within said range;

a motor for rotating said optical recording medium at the time of recording information and reproducing information;

an intensity modulation circuit for modulating a light intensity from said light source in accordance with recording information at the time of recording information; and a detection circuit for detecting recording information from reflection light reflected on said optical recording medium at the time of recording, wherein said control circuit controls said actuator so as to shorten said distance in stages from outside to inside a range where said near-field is formed and maintain it within said range.

14. A recording/reproducing apparatus as set forth in claim 13, wherein said control circuit controls said actuator to set said distance to an intermediate target value from an initial setting outside of said range, temporarily maintain it at said intermediate target value or substantially said intermediate target value, and bring it close from the intermediate target value to a final target value inside of said range.

15. A recording/reproducing apparatus as set forth in claim 13, wherein:

said control circuit generates a starting signal after said distance is kept inside said range; and said motor starts to rotate said optical recording medium based on said starting signal.

16. A recording/reproducing apparatus as set forth in claim 15, wherein said light source is a laser for outputting a laser beam to said optical system after said optical recording medium is rotating.

17. A recording/reproducing apparatus as set forth in claim 13, wherein said optical system comprises a first optical system having an object lens for converging light from said light source and a solid immersion lens for converging light passing through the object lens and focusing it on said optical recording system or a second optical system wherein said object lens and said solid immersion lens are made integral.

18. A recording/reproducing apparatus as set forth in claim 17, wherein:

said optical recording medium is an optical disk;

said solid immersion lens has a central portion on a surface facing said optical disk which projects out, has a peripheral portion which is flat and formed with a conductive film, and converges light passing through said object lens and passes it through said central portion; and said control circuit controls said actuator based on an electrostatic capacitance between said conductive film and said optical disk to adjust said distance.

19. A recording/reproducing apparatus as set forth in claim 13, wherein:

the numerical aperture of said optical system is larger than 1 and equal or smaller than 3; and a range wherein said near-field is formed is a range wherein said optical system and said optical recording medium are in a non-contacting state and said distance is 500 nm or less.

20. A method of driving a recording/reproducing apparatus using an optical system forming a near-field with an optical recording medium to focus converged light on the optical recording medium for recording or reproducing information, including the steps of:

shortening the distance between said optical system and said optical recording medium from outside to inside a range where said near-field is formed;

maintaining said distance within said range;

rotating said optical recording medium;

detecting recorded information from reflection light reflected at said optical recording medium during rotation at the time of reproducing information; and supplying modulated light modulated in intensity in accordance with recording information and focusing converged light from said optical system to said optical recording medium during rotation, wherein said distance is shortened in stages from outside to inside a range where said near-field is formed.

21. A method of driving a recording/reproducing apparatus as set forth in claim 20, wherein said shortening step includes the steps of:

setting said distance from an initial setting outside the range to an intermediate target value and maintaining it at said intermediate target value or substantial intermediate target value; and making said distance from said intermediate target value to a final target value inside said range.

22. A method of driving a recording/reproducing apparatus as set forth in claim 20, wherein said optical recording medium is rotated after said distance is maintained inside said range.

23. A method of driving a recording/reproducing apparatus as set forth in claim 22, further including a step of supplying a laser beam to said optical system after said optical recording medium is rotating.

24. A method of driving a recording/reproducing apparatus as set forth in claim 20, wherein:

the numerical aperture of said optical system is larger than 1 and equal or smaller than 3; and the range wherein said near-field is formed is a range wherein said optical system and said optical recording medium are in a non-contacting state and said distance is 500 nm or less.

* * * * *

UNITED STATES PATENT AND TRADEMARK OFFICE
CERTIFICATE OF CORRECTION

PATENT NO. : 6,404,710 B1
DATED : June 11, 2002
INVENTOR(S) : Isao Ichimura et al.

It is certified that error appears in the above-identified patent and that said Letters Patent is hereby corrected as shown below:

Column 1,
Line 23, change "A" to -- $\lambda$ --.

Column 3,
Line 44, delete "." after -- the -- (first occurrence).

Column 5,
Line 29, change "A" to -- $\underline{A}$ --;
Line 29, change "h" to -- $\underline{h}$ --;
Line 30, change "f" to -- $\underline{f}$ --.

Column 6,
Line 40, change "to" to -- $\underline{t}$ --;
Line 42, change "r" to -- $\underline{r}$ --;
Lines 43, 49 and 55, change "n" to -- $\underline{n}$ --;
Line 58, change "≈" to -- ≑ --;
Line 60, change "A" to -- $\underline{A}$ --;
Line 61, change "0<A≦100" to -- 0<$\underline{A}$≤100 --;
Line 61, change "A≈50" to -- A...50 --;
Line 66, change "C" to -- $\underline{C}$ --.

Column 7,
Lines 2, 28 and 29, change "D" to -- $\underline{D}$ --;
Line 6, change "≈40" to -- ≑40 --;
Lines 17 and 27, change "S" to -- $\underline{S}$ --;
Lines 19, 21, 30 and 34, change "h" to -- $\underline{h}$ --;
Lines 32, 35, 38 and 44, change "A" to -- $\underline{A}$ --;
Line 42, change "A" to -- $\underline{A}$ -- (both occurrences).

Column 8,
Lines 37, 45, 50 and 64, change "f" to -- $\underline{f}$ --;
Lines 40 and 47, change "L" to -- $\underline{L}$ --;
Line 43, change "f=" to -- $\underline{f}$=;
Lines 44, 49 and 58, change "A" to -- $\underline{A}$ --;
Line 44, change "h" to -- $\underline{h}$ --;
Lines 56, 61 and 65, change "fr" to -- $\underline{fr}$ --.

UNITED STATES PATENT AND TRADEMARK OFFICE
CERTIFICATE OF CORRECTION

PATENT NO. : 6,404,710 B1
DATED : June 11, 2002
INVENTOR(S) : Isao Ichimura et al.

It is certified that error appears in the above-identified patent and that said Letters Patent is hereby corrected as shown below:

Column 9,
Lines 12, 16, 18, 19, 27, 43, 46, 50 and 52, change "A" to -- $\underline{A}$ --;
Line 20, change "0<A≦100" to -- 0<$\underline{A}$≤100 --;
Line 20, change "A≈" to -- $\underline{A}$≑ --;
Line 20, change "h" to -- $\underline{h}$ --;
Line 44, "0<A≦200" to -- 0<$\underline{A}$≤200 --;
Line 45, change "0<A≦100" to -- 0<$\underline{A}$≤100 --.

Column 12,
Lines 27, 31, 37, 44, 51 56, 61 and 63 change "A" to -- $\underline{A}$ --;
Lines 30, 35, 48, and 54 change "fr" to -- $\underline{fr}$ --;
Lines 36, 55 and 60, change " f" to -- f --.

Column 13,
Lines 2, 40, 53, 59 and 63, change "A" to -- $\underline{A}$ --;
Lines 13, 17 and 20, change "V" to -- $\underline{Vc}$ --;
Lines 14 and 19, change "V" to -- $\underline{V}$ --.

Column 14,
Lines 3 and 43, change "A" to -- $\underline{A}$ --.

Column 15,
Line 67, change "Intermediate" to -- intermediate --.

Column 16,
Line 23, change "be am" to -- beam --.

Signed and Sealed this

Eleventh Day of February, 2003

JAMES E. ROGAN
*Director of the United States Patent and Trademark Office*